Figure 1:
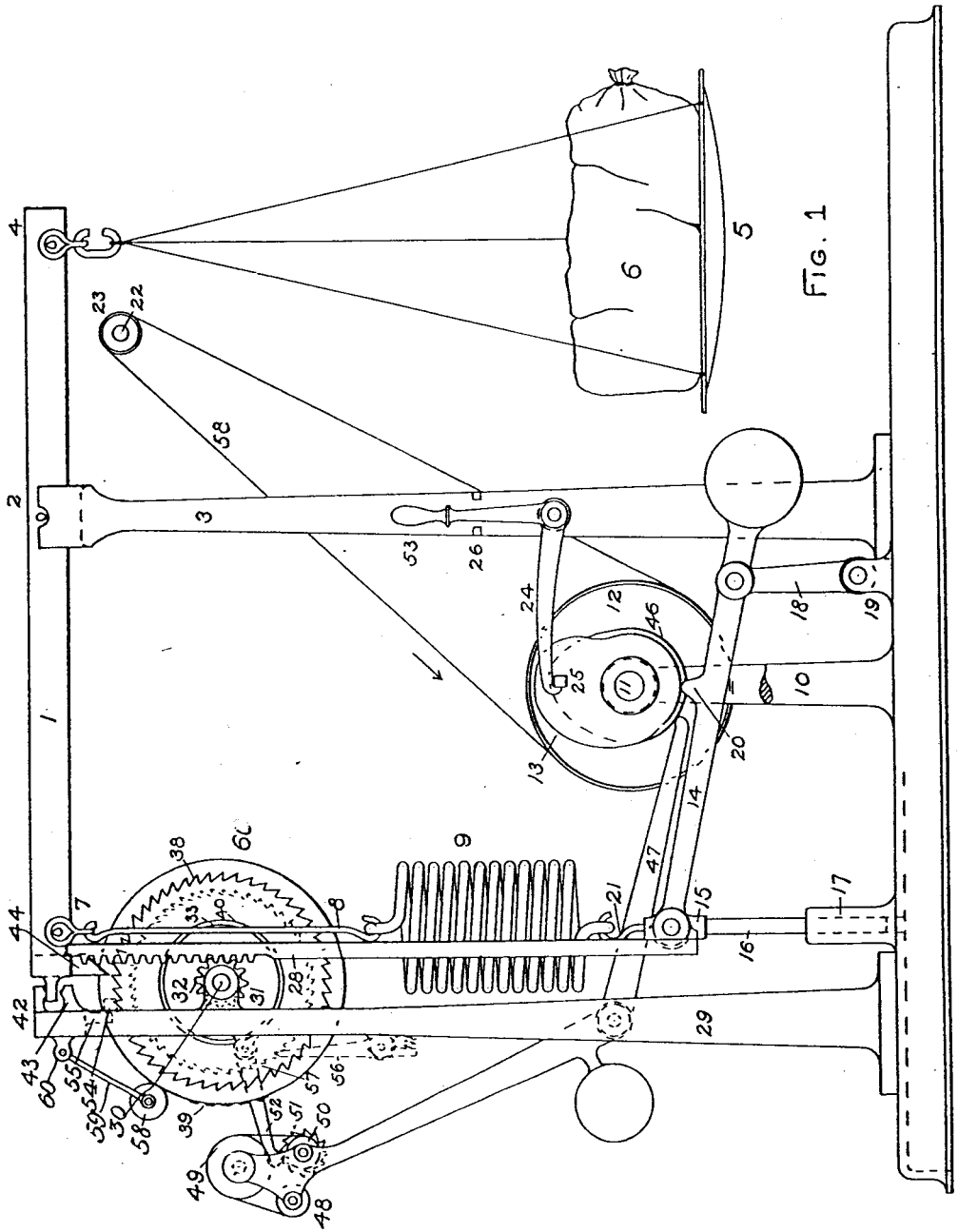

E. G. THOMAS.
FORCE MEASURING MACHINE.
APPLICATION FILED SEPT. 17, 1907.

1,120,762.

Patented Dec. 15, 1914.

2 SHEETS—SHEET 1.

WITNESSES
Henry Docker Jackson.
A. P. Milne

INVENTOR
Edward G. Thomas

E. G. THOMAS.
FORCE MEASURING MACHINE.
APPLICATION FILED SEPT. 17, 1907.
1,120,762.
Patented Dec. 15, 1914.
2 SHEETS—SHEET 2.
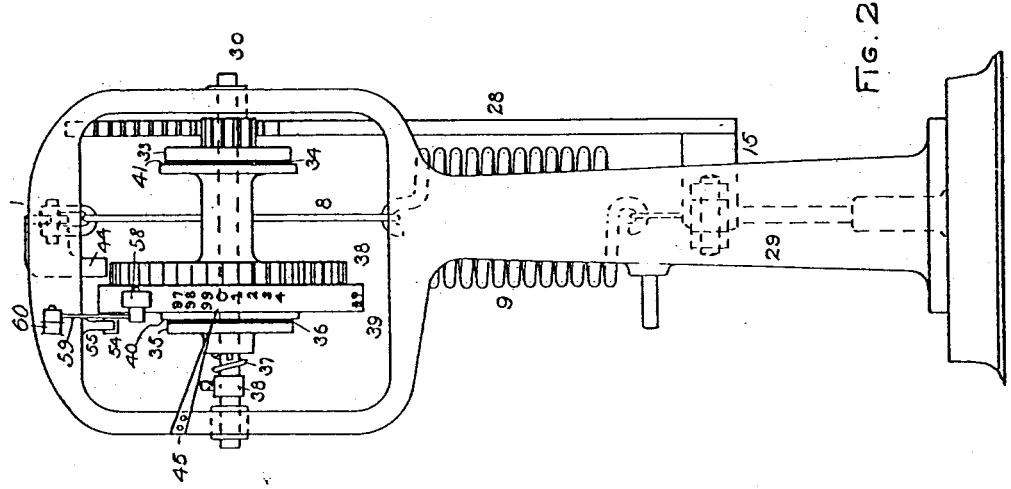
WITNESSES
INVENTOR

UNITED STATES PATENT OFFICE.

EDWARD G. THOMAS, OF NEW YORK, N. Y.

FORCE-MEASURING MACHINE.

1,120,762.

Specification of Letters Patent. Patented Dec. 15, 1914.

Application filed September 17, 1907. Serial No. 393,409.

*To all whom it may concern:*

Be it known that I, EDWARD G. THOMAS, of New York, county of New York, State of New York, have invented and produced certain new and useful Improvements in Force-Measuring Machines, of which the following is a specification.

My invention relates to improvements in the construction of instruments for measuring force, and more especially to those instruments serving to indicate or print the weight of an object or a mass of material.

My object is to provide a device which will be sensitive and accurate, and in which power necessary for its operation is entirely derived from a source outside the force to be measured.

The most obvious use of this invention is its application to the purposes of weighing; and I have illustrated and will describe it in connection with a scale by means of the drawings, which form a part of and accompany this specification, and the following description of its construction and operation.

In these drawings: Figure I is a side elevation of an embodiment of my invention, showing recording and printing mechanism. Fig. II is an end elevation of the recording device, the printing mechanism, and those parts beyond the recording mechanism having been removed to simplify the illustration.

In these drawings, 1 is a scale beam supported through knife edges 2, on a post 3. Suspended from one end by knife edge 4, is a scale pan 5, containing the object to be weighed 6. From knife edge 7, at the opposite end of scale beam 1, is suspended by means of link 8, a spring 9. Pivotally mounted upon post 10, is a shaft 11, having secured to it a pulley 12, and cam 13. Positioned beneath cam 13, is a lever 14, which is pivotally secured to a yoke 15, secured to a rod 16, which is slidably mounted in a boss 17, projecting from the base of the machine. The other end of lever 14 is pivotally secured to a link 18, which is pivotally mounted on post 19, secured to the base of the machine. Lever 14 has upon it a projection 20, serving to engage the working surface of cam 13. The hook 21 connects the lower end of spring 9 to yoke 15, and transmits to the lower end of the spring 9 any vertical motion of yoke 15. A driving shaft 22, by means of pulley 23 and belt 58, drives pulley 12, shaft 11, and cam 13 in the direction indicated by the arrow, this connection being of a yieldable character so as to permit motion of shaft 11 and its attached parts to be entirely stopped by means of a latch 24, engaging a block 25, secured to cam 13. Latch 24 is pivoted upon post 3, is provided with a handle 53, and its motion is limited by stops 26 and 27.

A rack 28, is secured to and moves with yoke 15. A standard 29, secured to the base of the machine, supports in working position a recording device operated by rack 28. This recording device consists of a shaft 30, rotatably mounted in bearings 31, secured to standard 29. Secured to shaft 30 is a pinion 32, which meshes with teeth of rack 28. A flange 33, provided with a leather face 34, is also secured to shaft 30; while a second flange 35, similarly provided with a face 36, is secured so as to rotate with shaft 30, but to be free to slide endwise along the shaft. A spring 37, and collar 61, constantly press flange 35 toward flange 33. Between these flanges is mounted a registering element 60, consisting of a ratchet wheel 38 and indicating wheel 39 secured together, and provided with friction faces, 40 and 41. This indicating element, though supported by shaft 30, is not secured thereto, but will turn with it under the influence of the frictional pressure of flanges 33 and 35, unless in some way restrained. Stops 42 and 43 respectively limit upward and downward motion of the end of scale beam 1. Secured to scale beam 1 is a dog 44, which is so located as to engage the teeth of ratchet 38 when the scale beam is in its lowest position, but is lifted out of engagement with these teeth when the scale beam is in its highest position. The edge of indicating wheel 39 is graduated for indicating the amount of the load upon the scale pan 5, and an index finger 45, secured to the frame of the machine, serves to point out the figure to be read. A second cam 46 is secured to shaft 11 and turns with it, and engages lever 47, pivoted to standard 29. At the opposite end of lever 47 is located a supply roll 48, an impression roll 49, and take-up roll 50. Secured to the take-up roll 50 is a ratchet 51, and positioned to engage this ratchet is a pawl 52, secured to standard 29. A strip of paper runs from the supply roll 48, around the impression roll 49, to take-up roll 50.

The operation of the device is as follows:

The object to be weighed having been placed in scale pan 5, handle 53 is pulled against stop 27, thereby releasing block 25 from latch 24, and permitting the rotation of the shaft and parts secured thereto. As the shaft rotates, lever 14 will be forced downward by the action of cam 13, thereby forcing downward yoke 15 with its attached parts and extending spring 9. As rack 28 moves downward, it will turn pinion 32, which will drive the registering element in the same direction through frictional pressure between flanges 33 and 35 and the corresponding surfaces on the registering element. As long as the upward strain on the scale beam caused by the load is greater than the strain caused by the extension of the spring, it will remain against its upper stop 42; but as the spring is gradually extended, its force will eventually become great enough to over-balance the weight of the load, and it will then force the scale beam downward against lower stop 43. Dog 44, moving downward with scale beam 1, will engage teeth of ratchet 38 and prevent the further rotation of the indicating wheel, which will, therefore, indicate by the figures opposite pointer 45, the weight of the object to be weighed. The downward motion of lever 14 and yoke 15, and the extension of spring 9, will continue to the maximum amount provided by the shape of cam 13. Since the downward motion of rack 28 will continue with that of yoke 15, the rotation of pinion 32 and flanges 33 and 35 will also continue after the motion of the indicating wheel is arrested, and the spring-pressed flanges 33 and 35 will slip on faces 40 and 41. The continuance of the motion of the shaft 11, beyond the point of greatest depression of lever 14, will permit the lever to rise, moving rack 28 upward, turning pinion 32 in the reverse direction, and gradually relieving scale beam 1 of the force due to the extension of the spring. When this force is relieved, so that it is again over-balanced by the weight of the object in the scale pan, scale beam 1 will rise, freeing the indicating wheel, which will then turn backward with the rotating pinion and shaft to its zero position, which is determined by a stop 54 upon the indicating wheel, engaging a stop 55 upon standard 29. The rotation of shaft 11 will cease when block 25 again engages latch 24, and no further movement of the device will occur until it is again released by moving handle 53.

As thus described, the device serves only as an indicating instrument; but is made a recording instrument by the operation of the printing device, as follows: At the time of greatest depression of lever 14, cam 46, which has been gradually depressing lever 47, reaches its point of greatest depression. Its opposite end carrying the paper-feeding rolls, is at this time forced firmly into contact with indicating wheel 39, and a record of the figures indicating the weight will be impressed upon the paper surface. Cam 46 releases lever 47 from its lowest position before cam 13 permits any return of lever 14, and the paper-feeding rolls are gradually returned to their starting position. During this travel, ratchet 51 is engaged by pawl 52, and turns one tooth, thus rolling up some of the paper strip upon take-up roll 50, and bringing a fresh surface of the strip at the printing point of impression roll 49, ready for the next operation of the machine. In order that the impression may be in ink upon the paper, an ink roller 58, of felt or other absorbent material, is supported by a link 59 pivotally attached to standard 29 by a lug 60. This ink roller 58 rests upon the edge of indicating wheel 39 and will ink the projecting numbers on indicating wheel 39 as they pass under the roller during the rotation of the indicating wheel. Where it is not desired to indicate the weight of each object weighed, but is desired to integrate the weights of successive objects, a pawl 56, shown in dotted lines and pivotally secured to standard 29, is provided which will engage the teeth of ratchet wheel 57 shown in dotted lines and secured to the indicating wheel, and prevent it from having any backward motion. The record of the weight of one object will then be added to the record made by the weighing of the previous object, and the difference between one reading and another will indicate the total weight of the objects weighed between these readings.

The scale illustrated is of the simplest possible form, but my invention is applicable to scales of every form and description, whether of simple balanced type or of the platform or other more complicated types, and is to be applied to scales having scale pans or platforms, or to scales having buckets or other containing devices. Further, the particular way in which power is applied for the extension of the spring is not of importance; it can be applied as shown, from a driving shaft, or the operation of the device can be accomplished by manual force applied to yoke 15, or to lever 14, or to shaft 11. The particular form of any of the parts may be modified or mechanical equivalents may be substituted, without modifying the character of my invention.

It is proposed that the ultimate extension of the spring, due to the travel permitted or caused, will impart a greater force to scale beam 1 than the upward force which will be caused by an object having the maximum weight for which the scale is designed. It will be desirable in the construction of the machine to put 100 graduations on the indicating wheel 39, and 100 teeth in ratchet 38, in order that in transmitting the indications of this wheel to succeeding counting wheels, the decimal system may be used.

Stated more briefly than above, the operation of my device is the gradual application in opposition to the force to be measured, of a force increasing to a determined maximum in each operation of the device; the simultaneous motion of a device recording the amount of the applied force, and the arresting of the motion of this recording device at the instant of the balancing of the applied force and the force to be measured.

Having thus fully described my invention, what I claim and desire to secure by Letters Patent of the United States is as follows:

1. In a force-measuring device, the combination of a means driven from a source of power extraneous to the machine, for applying a gradually increasing force in opposition to the force to be measured, said applied force exceeding at its maximum the force to be measured, an indicating element, mechanism giving to said element a movement coordinate with the increase of said opposing force and means for arresting the motion of the indicating element at the moment of balance between the force to be measured and the said opposing force, substantially as described.

2. In a force-measuring machine, the combination of a means for applying a gradually increasing force in opposition to the force to be measured, said applied force exceeding at its maximum the force to be measured, an indicating mechanism yieldingly driven by said means and a device for arresting the motion of said indicating mechanism at the moment of balance between the opposing forces, substantially as described.

3. In a force-measuring machine, the combination of a spring, a member for transmitting to one end of said spring the force to be measured, means for moving the other end of said spring to impart force to the spring in opposition to the force to be measured, an indicating element, mechanism adapted to impart to said indicating element a movement coordinate with that of said means, and means for stopping the motion of said indicating element by the movement of said transmitting member, substantially as described.

4. In a force-measuring apparatus, the combination of a spring, a member transmitting to one end of the spring the force to be measured, means for moving the opposite end of said spring in opposition to the force to be measured, a frictionally-driven indicating element and means, operatively connected with said transmitting member, for arresting its motion at the instant of balance between the opposing forces, substantially as described.

5. In a force-measuring apparatus, the combination of means for applying and varying a force in opposition to the force to be measured between zero and a predetermined maximum, a registering element, including a driving member and an indicating member, mechanism adapted to impart to said registering element a motion coordinate with that of said means, and a device for stopping the motion of the indicating member during the period of said increase of said opposing force and at the point of balance of this force and the force to be measured, substantially as described.

6. In a force measuring machine, the combination of a spring, a member transmitting to one end of said spring the force to be measured, means attached to the opposite end of said spring for imparting force to the spring in opposition to the force to be measured. a rack attached to said means, a registering apparatus driven thereby and including a yieldingly driven indicating member and means for stopping the motion of said indicating element at the point of balance of said opposing forces, substantially as described.

7. In a force-measuring machine, the combination of a spring, a member transmitting to one end of said spring the force to be measured, a cam operated means attached to the opposite end of said spring for imparting force to the spring in opposition to the force to be measured, a registering element including an indicating member, mechanism adapted to impart to said registering element a movement coordinate with the variation of said opposing force, and means for arresting the motion of the indicating member at the moment of balance between the force to be measured and the said opposing force, substantially as described.

8. In a force measuring machine, the combination of a spring, a member transmitting to one end of said spring the force to be measured, means attached to the opposite end of said spring for imparting force to the spring in opposition to the force to be measured, a yieldingly driven cam for operating said means, restraining means for governing the rotation of said cam, and registering means, substantially as described.

9. In a force measuring machine, the combination of a spring, a member transmitting to one end of said spring the force to be measured, means attached to the opposite end of said spring for imparting force to the spring in opposition to the force to be measured, a registering element including an indicating wheel and a ratchet wheel secured together and yieldably connected to the registering element, mechanism adapted to impart to said registering element a movement coördinate with the variation in the force of the spring, and a latch carried by the said transmitting member for engaging the teeth of the ratchet at the moment of balance of the opposing forces, substantially as described.

10. In a recording scale, the combination of a scale beam, a spring attached thereto, means for imparting force to the spring in opposition to the weight of the scale-load, a registering device including a yieldably driven indicating member, means adapted to impart to the said registering device a movement coördinate with the variation in the force of the spring, and means for stopping the motion of said indicating member at the point of balance between the scale-load and the force of the spring, substantially as described.

11. In a force measuring machine, means adapted to apply, in opposition to the force to be measured, a force, varying from zero to a predetermined maximum and back to zero, an indicating device, mechanism adapted to impart to said device a movement coordinate with the variation in said applied force, mechanism for stopping the movement of said indicating device at the moment of balance between the opposing forces and a locking member for releasing or restraining the motion of said means.

12. In a force measuring machine the combination of means driven from a source of power extraneous to the machine, for applying a gradually increasing force in opposition to the force to be measured, an indicating element, mechanism adapted to impart to said indicating element a movement coördinate with the variation of said opposing force, mechanism for arresting the motion of said indicating element at the moment of balance between the opposing forces, and printing means for recording the reading of said indicating element.

13. In a force measuring machine the combination of a scale beam, means for applying to the beam the force to be measured, a spring connected at one end of the beam, mechanism for moving the other end of the spring to impart force thereto in opposition to the force to be measured, a registering device, mechanism adapted to impart to said registering device a movement coördinate with the variation in force of said spring, and means for stopping the motion of said registering device at the moment of balance between the opposing forces.

14. In a force-measuring machine the combination of a scale beam, means for applying to the beam the force to be measured, a spring connected at one end of the beam, a revolving cam operatively connected to the other end of the spring, a registering device, mechanism adapted to impart to said device a movement coördinate with that of said spring, means for stopping the movement of said registering device at the moment of balance between the force to be measured and the force of said spring, and mechanism for stopping the rotation of said cam.

15. In a force-measuring machine, the combination of means for applying a force in opposition to the force to be measured, a registering element, including a driving member and an indicating member yieldingly driven therefrom, mechanism adapted to impart to said registering element motion coördinate with that of said means, mechanism for arresting the motion of said indicating member at the moment of balance between said opposing forces, and a device to prevent any motion of the indicating member in the reverse direction.

16. The combination, in a force-measuring machine, of a spring, a member transmitting to one end of the spring the force to be measured, means for moving the other end of the spring in opposition to the force to be measured, an indicating element, mechanism adapted to impart to said indicating element motion coördinate with that of said means, and a device operatively connected with said transmitting member for arresting the motion of said indicating element at the moment of balance between the force to be measured and the force of the spring.

17. In a force-measuring machine the combination of a spring, a member transmitting to one end of said spring the force to be measured, means for moving the other end of said spring in opposition to the force to be measured, an indicating element, mechanism adapted to impart to said indicating element motion coördinate with that of said means, a device operatively connected with said transmitting member for arresting the motion of said indicating element at the moment of balance between the force to be measured and the force of the spring, a recording surface, and means for impressing the record of the indicating element upon said recording surface.

18. In a force-measuring machine the combination of a spring, a member transmitting to one end of the spring the force to be measured, means for moving the other end of the spring between predetermined limiting positions, an indicating element, mechanism adapted to impart to said indicating element a movement coördinate with that of said means, and a device operatively connected with said transmitting member for arresting the motion of said indicating element at the moment of balance between the force to be measured and the force of the spring.

19. In a force-measuring machine the combination of means for applying a gradually varying force in opposition to the force to be measured, a member transmitting said applied force, an indicating element, mechanism adapted to impart to said indicating element motion coördinate with the variation of said applied force, and a device operatively connected with said transmitting member for arresting the motion of said indicating element at the time of balance between the opposing forces.

20. In a force-measuring machine the combination of means for applying a gradually varying force in opposition to the force to be measured, a member transmitting said applied force, an indicating element, mechanism adapted to impart to said indicating element motion coördinate with the variation of said opposing force, a device operatively connected with said transmitting member for arresting the motion of said indicating element at the time of balance between the opposing forces, and printing means, operatively connected with said means for applying the opposing force, for recording the reading of said indicating element.

21. In a force-measuring machine the combination of a scale beam, means for applying to the scale beam the force to be measured, means for applying to the scale beam a varying force in opposition to the force to be measured, a registering device for indicating the amount of the force to be measured, mechanism adapted to impart to said registering device motion coördinate with the variation of said opposing force and means operatively secured to the scale beam for stopping the motion of said registering device by the movement of the beam.

In testimony whereof, I have affixed my signature, in presence of two witnesses.

EDWARD G. THOMAS.

Witnesses:
WM. A. EVANS,
E. W. ULMAN.

Copies of this patent may be obtained for five cents each, by addressing the "Commissioner of Patents, Washington, D. C."